United States Patent [19]

Hase

[11] Patent Number: 5,329,220

[45] Date of Patent: Jul. 12, 1994

[54] SHUNT CONTROL

[76] Inventor: Alfred M. Hase, 6 Manorwood Dr., Scarborough, Ontario, Canada

[21] Appl. No.: 583,095

[22] Filed: Sep. 17, 1990

Related U.S. Application Data

[63] Continuation of Ser. No. 277,204, Nov. 29, 1988, abandoned.

[51] Int. Cl.[5] .............................................. H02J 7/04
[52] U.S. Cl. ................................... 320/23; 320/31; 363/89
[58] Field of Search ............................ 320/21–23, 320/30–32, 39, 40, 43, 57, 59; 363/60, 86, 89

[56] References Cited

U.S. PATENT DOCUMENTS

| Re. 24,823 | 5/1960 | Popa | 363/60 X |
|---|---|---|---|
| 3,428,882 | 2/1969 | Gilbert | 363/89 |
| 3,543,127 | 11/1970 | Fry et al. | 320/39 |
| 3,848,173 | 11/1974 | Hase | 320/23 |
| 3,944,904 | 3/1976 | Hase | 320/23 |
| 4,207,513 | 6/1980 | Hess, Jr. | 320/23 |
| 4,320,333 | 3/1982 | Hase | 320/31 X |
| 4,323,960 | 4/1982 | Jones | 363/89 X |
| 4,340,931 | 7/1982 | Endo et al. | 363/89 X |
| 4,394,612 | 7/1983 | Emerle et al. | 320/31 |
| 4,399,396 | 8/1983 | Hase | 320/43 |
| 4,437,148 | 3/1984 | Suranyi | 363/89 |
| 4,493,016 | 1/1985 | Cham et al. | 363/126 |
| 4,504,895 | 3/1985 | Steigerwald | 363/17 |
| 4,564,800 | 1/1986 | Jurjans | 320/39 X |
| 4,609,861 | 9/1986 | Inaniwa et al. | 320/23 X |
| 4,661,898 | 4/1987 | Hase | 320/39 X |

FOREIGN PATENT DOCUMENTS

| 0822798 | 9/1969 | Canada | 323/7 |
|---|---|---|---|
| 1111104 | 10/1981 | Canada | H02J 7/02 |
| 1159110 | 12/1983 | Canada | 320/12 |

Primary Examiner—Steven L. Stephan
Assistant Examiner—Kristine Peckman
Attorney, Agent, or Firm—Donald E. Hewson

[57] ABSTRACT

An electronic shunt control circuit for use in conjunction with battery charging circuits is disclosed. The circuit precludes the possibility of current eminating from charged batteries from DC biasing the control coil and shunt therefor, when there is no AC electrical energy being supplied to the circuit—such as during the occurrence of an AC power failure. Precluding such DC biasing is accomplished through the use of a plurality of blocking diodes located between the output to the battery and the control coil and shunt. A few milliamperes of current are acceptably permitted to flow back from the battery to the sensing and control circuit portion of the charging circuit, so as to maintain surveillance on the status of the battery and of the circuits; but no DC current is permitted, in the instance of an AC power outage to flow back from the battery through the control coil of the input AC reactor, due to the presence of the blocking or isolating diodes.

13 Claims, 3 Drawing Sheets

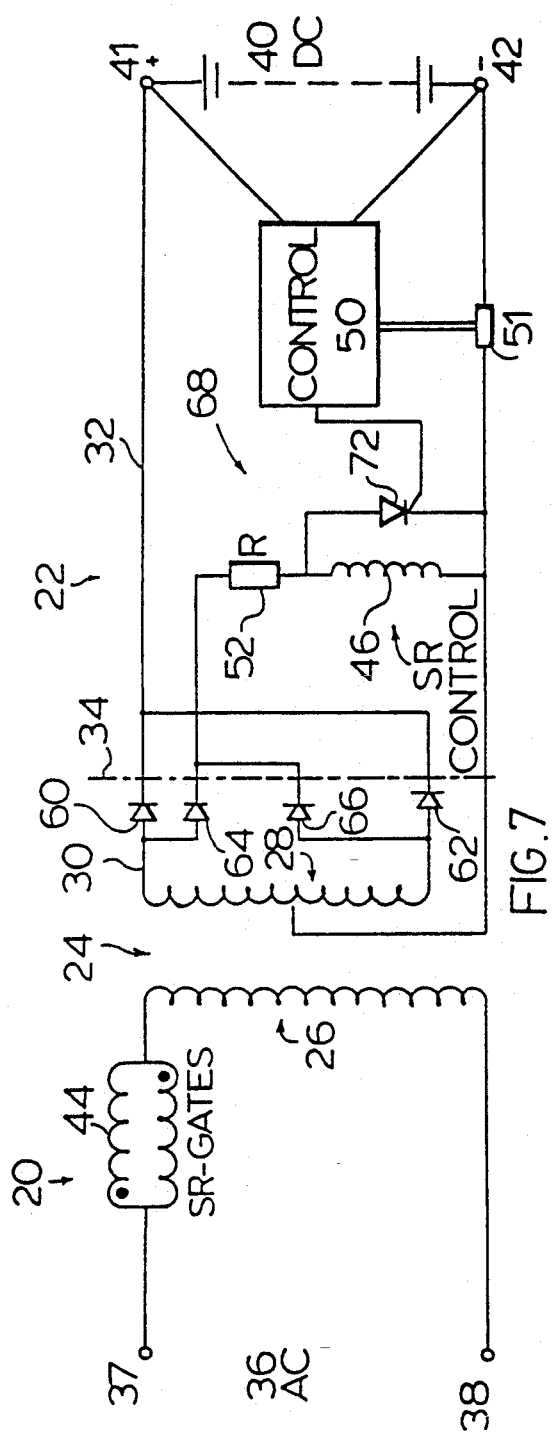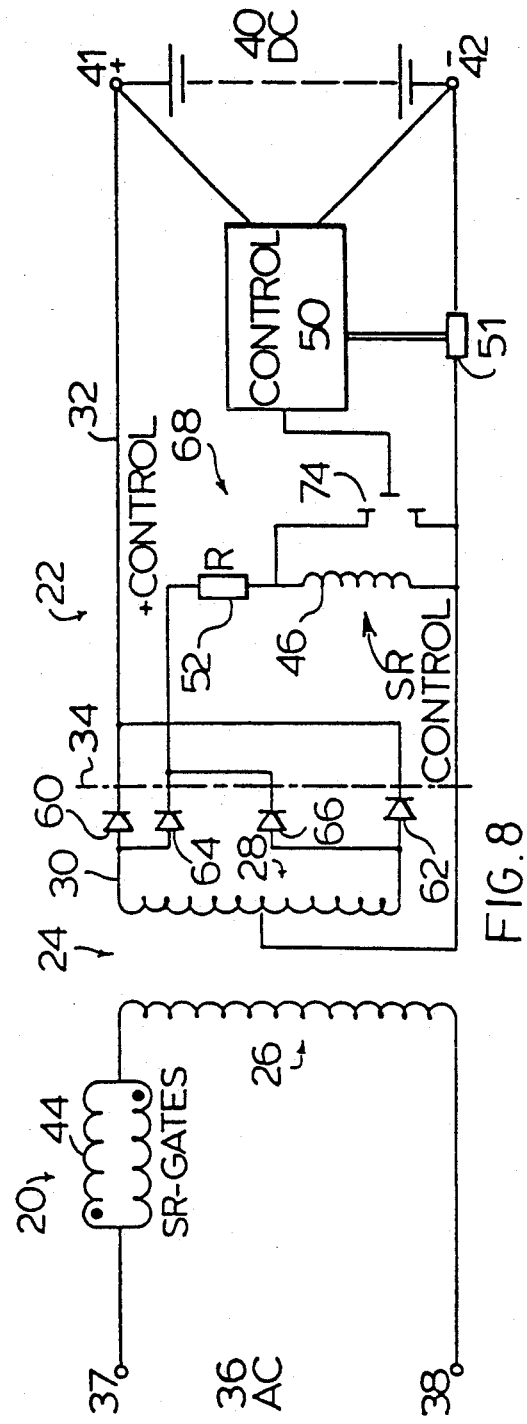

SHUNT CONTROL

CROSS REFERENCE

This is a continuation application of Ser. No. 277,204 filed Nov. 29, 1988, now abandoned.

FIELD OF THE INVENTION

This invention relates to electrical circuits having shunt control circuits therewithin, and more particularly to battery charging circuits having a shunt control circuit that precludes a battery from discharging back through the shunt control. Basically, the invention relates to circuits where the current through a control coil of a regulated input device, such as a saturable reactor is controlled by a shunted member across the coil. Such type of circuit is disclosed in Applicant's U.S. Pat. No. 3,848,173, issued Nov. 12, 1974 for STORAGE BATTERY CHARGING APPARATUS.

BACKGROUND OF THE INVENTION

Circuits for charging heavy duty batteries are well known and are in wide spread use in industry. Batteries being charged are typically found in industrial trucks, communications equipment, or float charge rectifiers, and may have amp-hour ratings of from 200 amp-hours to 1800 amp-hours, more or less. Motive power batteries are usually re-charged overnight, a period which could range from eight to sixteen hours; communications batteries are continually on charge. Motive power batteries may need to be charged from a virtual zero charge to a full charge for use the following day, which is done by an initial high constant current at an appropriate voltage, followed by a constant voltage tapering current charge, followed by a trickle charge—all as taught in the aforementioned patent. Other charging procedures may simply be carried out first at a constant voltage, then at a constant current; or simply in a constant current float charging mode. In all events, the energy supplied to the battery is derived from an AC source through suitable rectification, and under suitable surveillance of the battery condition and control of a synchronous switch in the output to alter the rate of energy input to the circuit.

An example of one such circuit is the inventor's Canadian patent 1,111,104 issued Oct. 20, 1981, for a "Battery Charger and Surveillance System". All such circuits, in any event, derive the power that controls the input synchronous switch—that is, the control current through the control coil of the synchronous switch—from the DC output side of the circuit. They also derive the power for the sensing circuit that controls the control coil from the DC output side of the circuit; but the sensing power is a very low power requirement at all times, whereas the control coil power may, at times, be a very high power requirement.

It is therefore an object of the present invention to provide a circuit where the control power requirements are separated from the sensing power requirement.

Control of a constant current or tapered current charging circuit is often accomplished by a shunt control circuit, an example of which is discussed in the inventor's Canadian patent No. 822,798 issued on Sep. 9, 1969. Such a shunt control is used to control the amount of current flow through the control coil of a saturable reactor or other synchronous switch device having a control coil, such as a magnetic amplifier. The shunt generally consists of a transistor, the base of which is connected to the output of a sensing and control circuit.

When a substantially fully discharged battery is connected to the charging circuit and the charging circuit is turned on, the amount of current to initially charge the battery may be at a maximum, as determined by the status of the battery being sensed by the control circuit. Resultingly, the output from the control circuit causes current flow through the control coil as discussed hereafter, which in turn permits the saturable reactor gates to transfer a controlled amount of power to the transformer. Thus a controlled amount of DC charging current is available to the DC output for charging the battery. Usually, if the battery is substantially in a state of discharge, the current through the saturable reactor or other controlled input device will be at a maximum, and the DC output current will also be at a maximum.

When the battery becomes fully charged, the control circuit provides a signal to the shunt transistor, which is thereby fully turned on. As a consequence, very little, if any, current flows through the saturable reactor control coil. In turn, the saturable reactor gates permit very little, if any, power to be delivered to the transformer and ultimately to the DC output portion of the circuit.

A problem that has previously occurred, however, is one of reverse power flow from a partially or fully charged battery especially in the event of a failure of the AC input power. In this circumstance, reverse power flow from the battery travels back through the circuit to the control coil. It is highly undesireable to supply power from the battery back through the control coil, since the battery can become discharged during AC power failure. It is acceptable, however, to supply a very small amount of power to the sensing circuit.

SUMMARY OF THE INVENTION

The present invention provides a shunt control circuit in a battery charging circuit that includes a pair of diodes adapted to preclude a back flow of current from the charged battery back to the control .coil. In practice, a negligible amount of current discharges from the battery to the sensing and control circuit, which current is significantly lower than the current that might flow back through the control coil without the inclusion of the isolating diodes. The negligable sensing current is acceptable in such charging circuits, as it will not significantly diminish the amp-hour capacity of a charged battery. By isolating the control power from the sensing power, without the necessity of a separate power supply—which additional power supply is precluded by the provision of the isolating diodes—a soft walk-in after an AC power outage is assured. That means that, when the circuit re-starts after AC power is restored, there is a gradual buildup of control current and DC saturation over the first 6 to 12 cycles, during which the synchronous switch reactor absorbs most of the input AC energy, thus preventing high inrush currents.

BRIEF DESCRIPTION OF THE DRAWINGS

This invention will now be described in association with the accompanying drawings, in which:

FIG. 7 shows a circuit similar to FIG. 1 except that an SCR is used; and

FIG. 8 shows a circuit similar to FIG. 1 except that a field effect transistor is used.

DETAILED DESCRIPTION OF THE PREFERRED EMBODIMENTS

Figure 1:
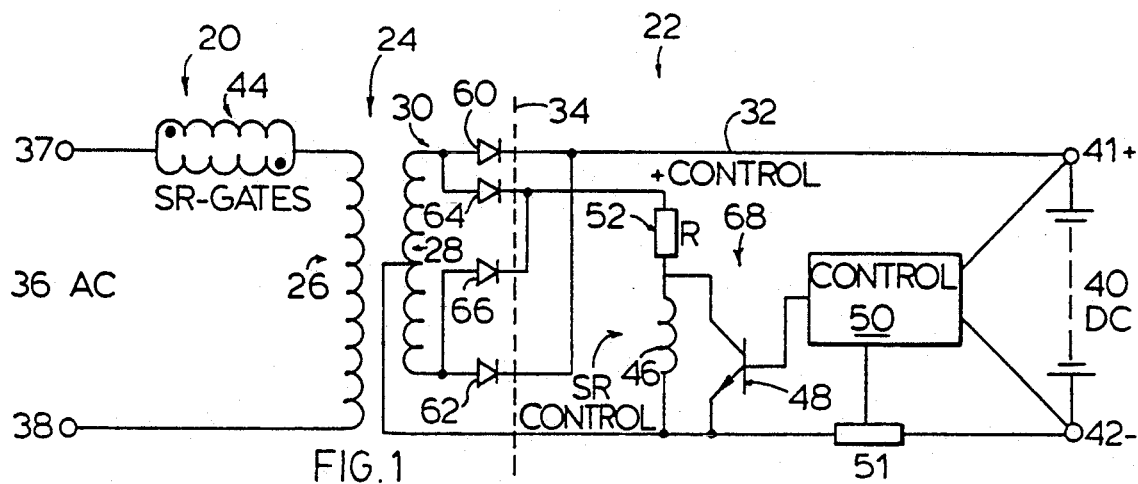
FIG. 1 shows a basic single phase battery charging circuit having diode means for precluding current flow from the battery.

FIG. 1 is a simplified schematic of a basic single phase battery charging circuit of the present invention. The circuit consists of a primary side 20 and a secondary side 22, on either side of transformer 24. The transformer, of course, has a primary winding 26 and a secondary winding 28. The secondary side 22 of the circuit is divided into an AC portion 30 and a DC portion 32 around or at the dash-dot line 34.

The circuit is adapted at its input for connection to an AC source of electrical power 36 at its inputs 37, 38. The AC power is passed into transformer 24, and it of course provides the power for the DC portion 32 of the secondary side 22 of the circuit. The DC portion 22 of the circuit is adapted for connection to a battery 40 at outputs 41, 42 with 41 being the positive terminal of the output and 42 being the negative terminal of the output.

The power available to the primary side 26 of the transformer 24 is of course largely passed over to the secondary side 28 of the transformer 24, usually at a different voltage level, in order to facilitate the voltage level of the battery being charged. In order to rectify the AC power available at the secondary side 28 into DC power, diodes 60, 62, 64 and 66 are used. Main diodes 60 and 62 form rectification means for providing the battery 40 with DC power and they are power diodes. Auxilliary diodes 64 and 66 form rectification means for providing the shunt circuitry 68 with power, and they are low current diodes. These rectification means provide a full wave unfiltered DC power. Not shown is any filtering means for filtering the full wave DC power into nearly ripple-free DC power, if necessary for communication battery charging purposes.

This present circuit arrangement differs from the prior art, as found for example in the inventor's prior Canadian patents 1,111,104 and 1,159,110 noted above, in the following respects. In these prior patents, the two power diodes, which are equivalent to main diodes 60, 62 of the present invention, provide DC power for the battery being charged, the control circuitry, and the shunt circuitry. In the present invention, the leads at the negative end of the diodes, which lead to the shunt circuitry, have been placed ahead of the main rectifying diodes 60, 62 and are in direct connection with the transformer. Auxilliary or control power diodes 64, 66, are typically low current diodes, and have been included to provide the required rectification.

The amount of power passed to the primary side 26 of the transformer 24 is dependent on the ampere-turns transductor—more specifically a saturable reactor 44. Equivalently, another type of ampere-turns transductor having a control coil could be used, such as a magnetic amplifier. The transductor shown in FIG. 1 is configured in a parallel manner, but alternatively it is possible to have a suitable transductor configured in a serial manner. Also, in bridge configuration circuits, the transductor could be located on the secondary side of the transformer instead of on the primary side.

In any event, the ampere-turns transductor such as the saturable reactor 44 has a control coil 46, which is part of the DC portion 32 of the circuit. The amount of current in the saturable reactor 44 is related to the current in the control coil 46, which is determined by the state of conduction of the shunt transisitor 48. The state of conduction of the transistor 48 is determined by a signal from the control circuit 50. Typically, the average current through the transistor 48 when it is fully shunting is higher than the average current through the control coil 46 when it is fully conductive; i.e., when transistor 48 is turned off (is non-conductive).

The control circuit 50 includes sensing means for measuring the amount of current flowing to the battery being charged, by means of a metering shunt, which is used in the circuit in the usual and accepted manner for shunt.

When the signal from the control circuit 50 is present, the transistor 48 is switched on and therefore is in a state of conduction, which channels current away from the control coil 46. All current flowing through the shunt circuitry 68, which comprises the control coil 46, the shunt transistor 48, and a current limiting resistor 52, must flow through the resistor 52 and is divided between control coil 46 and shunt transistor 48—depending on the state of conduction of the shunt transistor 48.

If the shunt transistor is turned off, again by the control circuit 50, it is in a low state of conduction and virtually all of the current flow in the shunt circuitry 68 is directly through the control coil 46—a state of maximum power delivery through the saturable reactor 44.

The control current through the SR control coil 46 is derived from the unfiltered full wave DC supply and as a result, the transistor 48 is switched on for part of each cycle, and is switched off for the remaining part of the cycle. The situation where the transistor 48 is conducting partially is substantially precluded.

When the transistor 48 is switched on, it conducts a relatively large amount of current but has a very low saturation voltage drop across it, since particularly all of the voltage drop would be across the resistor 52. Resultingly, the power consumption is relatively low, since power consumption is a product of the current flow and the voltage drop. Alternatively, when the transistor 48 is switched off, very little current is flowing through it, which again minimizes the power consumption.

The situation of having the transistor 48 conduct partially, which would also produce a substantial voltage drop across it, and a correspondingly high power consumption, is avoided. This is advantageous, in that the transistor runs cooler due to the low power consumption.

The amount of time the transistor 48 is switched on in each cycle is inversely proportional to the state of charge of the battery, and is determined by sensing the voltage cross output terminals 42. During the initial stages of charging, the battery requires full charging current. The signal from the control circuit 50 would be virtually non-existent, which keeps the transistor 48 from conducting. Correspondingly, the control coil 46 has full current flowing through it resulting in maximum DC current for battery charging. As the battery becomes charged, the control circuit 50 provides a signal to the shunt transistor 48, which turns the transistor on for that period of time. During that period of time current does not flow through the control coil 46, and resultingly the saturable reactor 44 does not allow AC power to be provided to the transformer 24, thus effectively reducing the DC current used to charge the battery.

When the battery is fully charged, it can be seen that the control circuit 50 would turn the transistor 48 on continually, thus shunting and bypassing the control coil 46, which results in no power being supplied for battery charging.

The control circuit 50, however, does require a small amount of sensing current to keep it operating. This sensing current cannot be supplied by the AC power source, since the power source is effectively shut off. The power may be supplied by an independent power supply; however, it is quite satisfactory to provide the sensing power to the control circuit 50 from the charged battery 40. Due to the high internal impedence of the control circuit 50, this sensing current is limited to a virtually insignificant level, and thus does not materially affect the amp-hour stored energy of the battery 40.

The shunt circuitry 68, however, does not have a high impedance, and any back current flow therethrough would be of an amount great enough to affect the amp-hour stored energy capacity of the battery 40. Therefore, there must be means provided to preclude such back current flow through the shunt circuitry 68. Such a means is provided for in the form of main or isolating diodes 60, 62. Any back current is blocked from flowing between the positive and negative terminals 41, 42 of the battery 40 by these main diodes 60, 62. In order that the shunt circuitry 68 can be protected in the above described manner by these main diodes 60, 62, yet be supplied with full wave rectified power, auxilliary diodes 64, 66 have been included.

Another problem that is created by back current flow from a charged battery when means to block such flow does not exist, is that the control coil 46 becomes DC biased by this back current. This DC bias would cause the control coil to be in a conductive state when a load is connected to the outputs 41 and 42. When power is subsequently supplied to the circuit, an immediate inrush of DC current to the battery occurs, which is undesirable. However, in keeping with this invention, with the back current flow blocked, there is no DC bias across the control coil 46, and thus the coil is precluded from being in a conductive state. When the AC power is subsequently returned to the circuit, the control coil 46 has a response time of about 6 to 12 cycles of the power source to reach its fully conductive state. This prevents a sudden inrush of current to the battery, and instead provides for a "soft walk-in" current, as noted above.

In the preferred embodiment, an NPN transistor has been used in conjunction with the control coil 46, and of course is connected to the negative side of the circuit. This is an advantageous configuration because the circuit is easily adaptable for interfacing with micro-chip based equipment, such as digital meter chips or timing chips.

In an alternative embodiment of the device, it is contemplated that a silicon controlled rectifier 72, as shown in FIG. 7, could be used in place of the shunt transistor of the preferred embodiment. This silicon controlled rectifier could be turned on so as to conduct and turned off so as not to conduct, in a manner similar to the above mentioned shunt transistor. It could conceivably be controlled by the same type of control circuit as the shunt transistor, with little or no modification to the control circuit. Likewise, a field effect transistor 74, as shown in FIG. 8, could be used in a similar circuit. Moreover, the NPN transistor could be operated as a Class B amplifier, acting in a switch mode; whereby its operation would more or less emulate that of an SCR.

Figure 2:
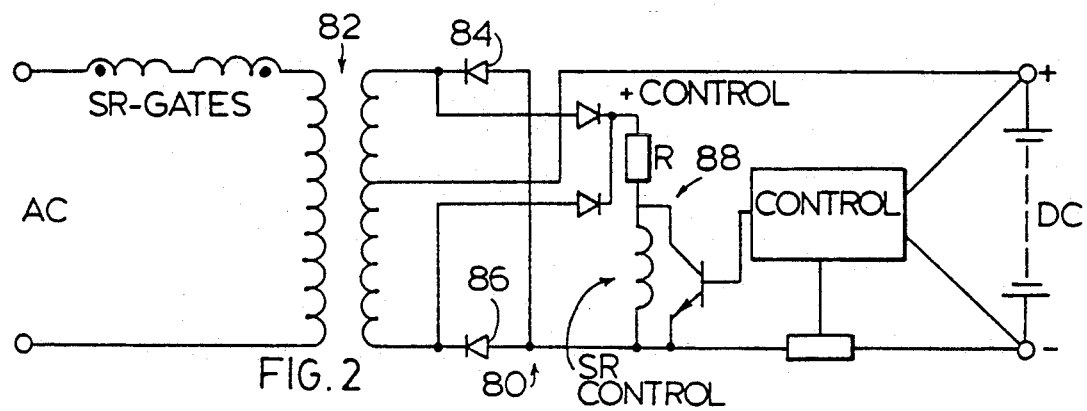
FIG. 2 shows a circuit similar to FIG. 1 except that the voltage in the control circuit is doubled.

Reference is now made to FIG. 2, which shows a circuit that is similar to FIG. 1, but includes two basic changes. One change is that the negative side 80 of the circuit is connected to an end terminal of the transformer 82, and not to the centre tap terminal, and that the power diodes 84 and 86 have been reversed. Correspondingly, the output side of each diode, in this case the positive side, has been connected to the negative side 80 of the circuit. The smaller rectification diodes which provide rectified power to the shunt circuit 88, are connected one to each end terminal of the transformer. The negative side of the circuit has been connected to the opposite end terminal of the transformer than are the power diodes, instead of to the centre tap terminal as in FIG. 1. Correspondingly, the voltage across the shunt circuit 88 is twice the voltage supplied in the circuit of FIG. 1, thus providing it with more control power and correspondingly better control characteristics. This configuration is typical in lower voltage circuits. The output for charging the battery is also centre tapped in this embodiment, thus keeping it at the same voltage as in FIG. 1.

The second change includes re-arranging the saturable reactor gates 90 into a series configuration. This has been included to illustrate that either a parallel arrangement or a series arrangement is acceptable.

Figure 3:
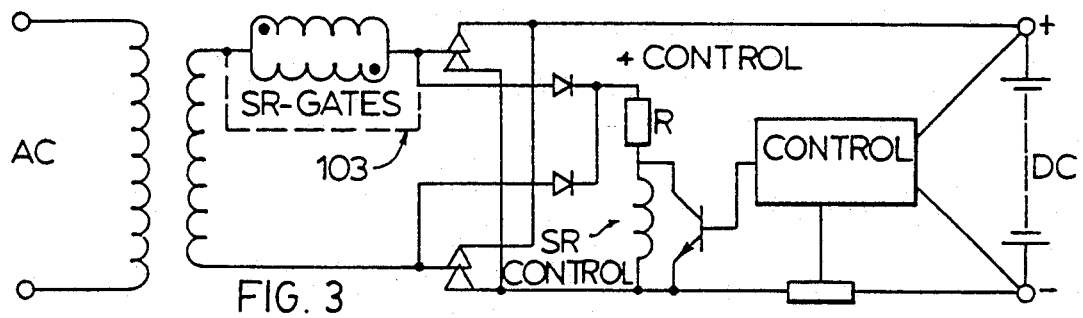
FIG. 3 shows a circuit similar to FIG. 1 except that the main rectifier is a bridge circuit.

Reference is now made to FIG. 3, which shows a circuit that is similar to FIG. 1 except that it uses a bridge circuit equivalent to the rectification circuit shown in FIG. 1, to obtain full wave rectification. Also, the saturable reactor gates 100 have been included on the secondary side 102 of the transformer 104. Having the saturable reactor gates 100 on either side of the transformer 104 is acceptable in a bridge configuration circuit; and it is also possible to connect the auxilliary diodes directly to the secondary winding of the transformer as indicated by a dashed line at 103.

Figure 4:
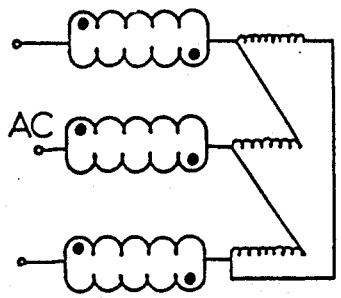
FIG. 4 shows a bridge circuit similar to FIG. 3 except that it is a three phase bridge circuit.
Figure 4:
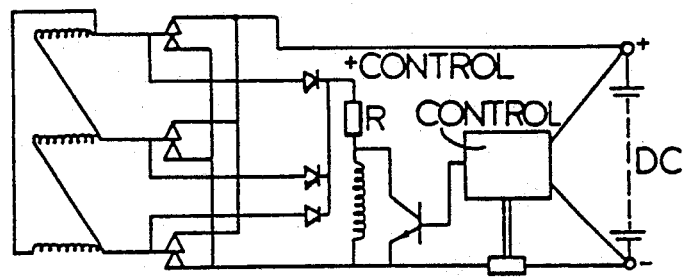

An alternative embodiment of the device is shown in FIG. 4, which shows a three phase bridge circuit that is otherwise similar to FIG. 3.

Figure 5:
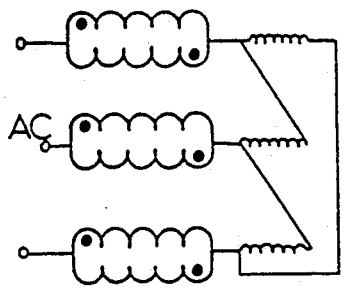
FIG. 5 shows a circuit similar to FIG. 4 except that it is a six phase star circuit.
Figure 5:
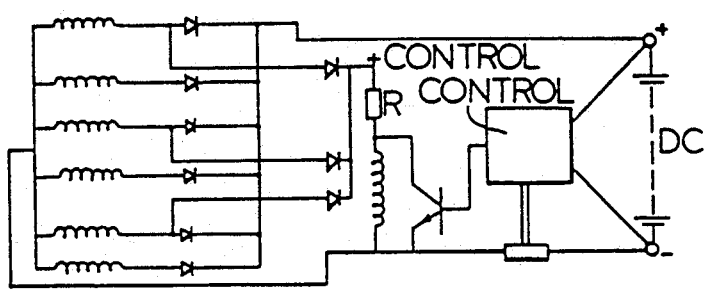

A still further alternative embodiment of the device is shown in FIG. 5 which shows a circuit similar to that shown in FIG. 1 except that there are six secondary windings on the transformer, the windings being configured in a star arrangement such that a six phase output is produced.

Figure 6:
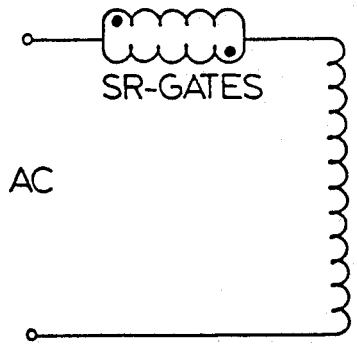
FIG. 6 shows a circuit similar to FIG. 1 except that a PNP transistor is used.
Figure 6:
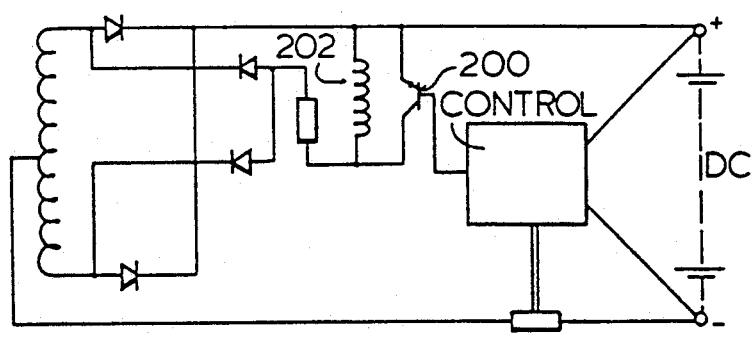

A final alternative embodiment is shown in FIG. 6. It is very similar to the circuit of FIG. 1, except that it employs a PNP transistor 200 across the control coil 202, both of which are directly connected to the positive side of the DC portion of the circuit.

Other modifications and alterations may be used in the design and manufacture of the shunt control circuit of the present invention without departing from the spirit and scope the accompanying claims.

What is claimed is:

1. A solid state battery charging circuit having a shunt regulating control circuit, comprising:
    AC power input means:

an isolating transformer, having a primary input side and a secondary output side, with said input side connected to said AC power input means, and said output side having a first terminal, a second terminal, and a third terminal, wherein said third terminal is a centre tap terminal between said first and second terminals;

a controllable synchronous switch means having a control coil, and arranged for regulating the amount of power that is input to a battery being charged by said battery charging circuit, said switch means being located on either the primary side or the secondary side of said isolating transformer;

said control coil being connected in a conductive string across the secondary side of said isolating transformer;

a pair of DC output terminals, a first one of which is connected through full wave rectifying means to said first and second terminals of said transformer output, and the other of which is connected to said centre tap terminal;

said full wave rectifying means comprising a first pair of main diodes, wherein said main diodes also preclude back current flow from a battery connected to said pair of DC output terminals;

shunt means connected in parallel to said control coil for controlling the amount of DC current flowing to said control coil;

control circuit means connected across said pair of DC output terminals to determine the output status of said full wave rectifying means, and changes thereof, and to generate control signals therefor; said control circuit means being powered from a battery connected to said pair of DC output terminals;

auxiliary full wave rectifying means including a pair of auxiliary diodes, comprising a first auxiliary diode and a second auxiliary diode, with said first auxiliary diode having its positive terminal connected in constantly conductive relation to said first output terminal of said isolating transformer, and its negative terminal connected in conductive relation to said control coil; and said second auxiliary diode having its positive terminal connected in constantly conductive relation to said second output terminal of said isolating transformer, and its negative terminal connected in conductive relation to the negative terminal of said first auxiliary diode;

whereby an auxiliary full wave DC voltage is produced to provide DC power for said control coil, and said shunt means, irrespective of the state of the charge of the battery being charged; and whereby reverse current flow from said battery through said control coil, when said AC power input means is not delivering power to said battery charging circuit, is precluded.

2. The solid state battery charging circuit of claim 1, wherein said shunt means comprises an NPN transistor.

3. The solid state battery charging circuit of claim 1, wherein said shunt means comprises an PNP transistor.

4. The solid state battery charging circuit of claim 1, wherein said shunt means comprises a field effect transistor.

5. The solid state battery charging circuit of claim 1, wherein said shunt means comprises a silicon controlled rectifier.

6. The solid state battery charging circuit of claim 2, wherein said NPN transistor acts as a Class B amplifier in switch mode.

7. The solid state battery charging circuit of claim 1, wherein said synchronous switch is a saturable reactor, and the control coil therefor has no DC bias when the AC power is off.

8. The solid state battery charging circuit of claim 1, wherein said circuit is a single phase centre-tapped circuit.

9. The solid state battery charging circuit of claim 1, wherein said circuit is a single phase bridge circuit.

10. The solid state battery charging circuit of claim 1, wherein said circuit is a three phase bridge circuit.

11. The solid state battery charging circuit of claim 1, wherein said circuit is a six phase star circuit.

12. The solid state battery charging circuit of claim 1, wherein said controllable synchronous switch means has gate coils arranged in parallel.

13. The solid state battery charging circuit of claim 1, wherein said controllable synchronous switch means has gate coils arranged in series.

* * * * *